United States Patent [19]

Schnelle et al.

[11] Patent Number: 5,373,047

[45] Date of Patent: Dec. 13, 1994

[54] BLASTING MEDIUM, PROCESS FOR ITS PRODUCTION, AND USE THEREOF

[75] Inventors: Albert Schnelle, Domat/Ems; Helmut Thullen, Bonaduz, both of Switzerland

[73] Assignee: Ems-Inventa AG, Switzerland

[21] Appl. No.: 994,137

[22] Filed: Dec. 21, 1992

[30] Foreign Application Priority Data

Dec. 23, 1991 [DE] Germany .............................. 4142893
May 6, 1992 [DE] Germany .............................. 4214988

[51] Int. Cl.$^5$ ................................................. C08K 3/08
[52] U.S. Cl. ..................................... 524/439; 524/440; 428/402; 428/402.24; 428/403; 428/407; 451/36; 451/38; 451/39
[58] Field of Search ................ 524/439, 440; 428/402, 428/402.24, 403, 407; 51/295, 298, 309, 317, 319, 320

[56] References Cited

U.S. PATENT DOCUMENTS

| | | | |
|---|---|---|---|
| 4,057,607 | 11/1977 | Soehngen et al. | 264/28 |
| 4,466,912 | 8/1984 | Phillips et al. | 252/512 |
| 4,666,465 | 5/1987 | Matsumoto et al. | 51/293 |
| 4,776,679 | 10/1988 | Kageyama et al. | 252/512 |

*Primary Examiner*—Edward Cain
*Attorney, Agent, or Firm*—Jordan B. Bierman

[57] ABSTRACT

A reusable blasting medium of a thermoplastically processable polymer granulate filled with finely divided metal, the metal particles being coated with an adhesion promoter. The medium is suitable for the deflashing of cast metal parts, in particular ground, die-cast metal parts. The invention further relates to a process for the production of the blasting medium, including intimately mixing a polymer granulate of a commercial thermoplast, such as polyamide and/or polycarbonate, with a metal such as iron, copper, tin, stainless steel, brass, and/or bronze. The particles are coated with an adhesion promoter, the metal particles are in finely divided spherical form or a powder and the particle sizes are 0.01 to 0.5 mm. This mixture is extruded in the usual manner, preferably as a ribbon, and thereafter is reduced to the desired form and size. The blasting medium has the form of cubic particles of an edge length of 0.75 to 2.0 mm.

22 Claims, No Drawings ial polyamide and polycarbonate types, specifically
BLASTING MEDIUM, PROCESS FOR ITS PRODUCTION, AND USE THEREOF This Application claims the benefit of the priority of German Applications P 41 42 893.5, filed Dec. 23, 1994, and P 42 14 988.6, filed May 6, 1992.

The invention pertains to a reusable jet blasting medium consisting of a thermoplastically processable polymer granulate filled with finely divided metal. The invention relates further to a process for the production of this blasting medium and the method of the use of the polymer granulate for deflashing cast metal parts, particularly those which are ground.

BACKGROUND OF THE INVENTION

Cast or die-cast metal parts made in a foundry have a certain amount of flashing residues which must be removed; for economic reasons, these residues must be removed quickly and easily. Deflashing by particle blasting is at present the best developed and most economical method, it is important, in this context, that the particles must be less hard than the material to be deflashed.

In the prior art, the aftertreatment of surface-ground diecast metal parts, e.g. of aluminum, is carried out with vegetable blasting materials such as ground nutshells and apricot pits, and/or with ground duroplastic wastes, glass balls, scrap metal, glass-filled thermoplastic plastics, and the like. According to the state of the art, the smallest particles should have a diameter not less than 0.5 mm, otherwise the impingement energy is too low.

All blasting media referred to have the disadvantage that, in addition to deflashing, they adversely affect the surfaces of the parts. They lead to undesired matting and roughening, as well as to "shotpeening" when using blasting media of high specific gravity such as iron or steel. Due to breakage, nutshells, apricot pits, and duroplastic plastics cause intensive dust development, which itself requires aftertreatment of the parts. Glass beads break and attack the surfaces. The thermoplastic plastics filled with glass beads last long and allow good deflashing, but cause matting and even roughening of the surfaces.

Unfilled thermoplastic plastics are exceptions. With respect to durability, these blasting media, in particular polyamides and polycarbonates, are probably superior to all other products, but because of their low specific gravity they exhibit insufficient deflashing action.

From German patent DE 960,418, blasting media consisting of a mixture of a plastic with a metallic/mineral material in granular form or containing polyamide or glass fiber are known. However, the plastics recommended there must be hardened by suitable post treatment. Because of their pronounced abrasive action, the recommended granular admixtures such as corundum, quartz, and various metals do not permit extruder processing for intimate mixing with the plastics. The blasting media themselves can be reused only to a very limited extent, as they are decomposed into their components during deflashing as a result of their high impingement energy.

SUMMARY OF THE INVENTION

It is, therefore, among the objects of the invention to provide blasting media for the deflashing of cast or ground diecast metal parts which do not have the disadvantages of the prior art and, in particular, do not adversely affect the surface of the parts to be deflashed, yet can be re-used. Further a method for the production of such blasting media is also desirable.

It has now been found that, surprisingly, polymer granulates which are filled with finely divided metal do not adversely alter the surfaces, especially ground or polished surfaces, of cast metal parts during deflashing. To this end thermoplastics are especially suitable, as they have a certain degree of impact toughness and thus do not break up when impinging on the metal parts.

Suitable metals are preferably iron, copper, tin, and, more desirably those alloys thereof which are softer than the processing equipment, e.g. the structural parts of the extruders. Especially preferred is finely divided bronze, which is usable ideally in spherical form and is extrudable with polymers without difficulties or abrasion; indeed, an advantageous lubricating effect occurs in the extruder.

The finely divided metal particles are preferably coated with adhesion promoters of the commercial amino or epoxy silane type. One uses silane in a quantity of 0.1% to 0.4% by weight, preferably 0.2% to 0.25% which can be applied e.g. by a drum mixer, possibly with the use of suitable inert solvents. As the finely divided metals the commercial types in spherical or powder form are satisfactory; their diameter is desirably between 0.01 and 0.5 mm. Especially suitable are particle sizes between 0.05 and 0.1 mm.

The thermoplast granulates are preferably commercial polyamide and polycarbonate types, specifically mentioned are homo- and copolyamides. Especially preferred are PA 6; PA 6,6; PA 11; PA 12; and mixtures thereof. All impact toughness modifiers common in the state of the art can be added to the overly brittle polymers. The proportion of metal in the blasting media according to the invention is 20% to 90% by weight, with 60% to 80% being especially preferred. The advantageous granulate form is cubic with edge lengths between 0.50 and 2.0 mm, with edge lengths between 0.75 and 1.5 mm being especially preferred.

The blasting media according to the invention, consisting of polymer granulate filled with finely divided metal, are produced by selecting as a suitable polymer granulate one consisting of commercial thermoplast which is a polyamide and/or a polycarbonate and, as the metal, iron, copper, tin, or an alloy of stainless steel, brass, and/or bronze. The metal or the alloys are to be present in particle sizes of 0.01 to 0.5 mm diameter; and should contain 0.1% to 0.4%, preferably 0.2% to 0.25% by weight epoxy silane. They are placed in a mixer open to atmospheric moisture, to produce an intimate mixture of polymer melt and metal or alloy, preferably in an extruder. The mixture is then extruded in the conventional manner, preferably as a ribbon; after discharge, it is reduced by cutting to the desired form and size. The blasting medium thus produced is in the form of cubic particles having edge lengths of 0.50 to 2.0 mm. The blasting media according to the invention are suitable for use in all conventional deflashing methods, preferably blasting wheels, pressure jets, or injector systems.

The blasting media according to the invention exhibit, as compared with the prior art, no dust development due to breakage and/or separation of the components, so that subsequent cleaning of the deflashed parts is unnecessary It is even possible, unexpectedly, to re-use the media cost-efficiently. Moreover, the higher specific gravity and the resulting higher kinetic energy of the metal-filled blasting media, make it possible to operate blasting wheels at lower speeds, and pressure jets and injector systems at lower operating pressures.

The use of polymer granulate filled with finely divided metal for the production of blasting media has thus proven to be particularly advantageous, cost-efficient, and quality improving. Commercial thermoplasts, specifically polyamide or polycarbonate types, are filled with finely divided iron, copper, tin or alloys thereof which are present in spherical or powder form, with particle sizes of 0.01 to 0.5 mm. The blasting medium preferably has the form of cubic particles with edge lengths of 0.5 to 2.0 mm. In this connection, polyamide 11 or polyamide 12 which is filled with spherical bronze particles having a diameter of 0.03 to 0.1 mm is particularly well suited, whereby the preferred edge length lies between 0.8 and 1.2 mm.

While only a limited number of specific embodiments of the present invention has been expressly disclosed, it is, nonetheless, to be broadly construed and not to be limited except by the character of the claims appended hereto.

What we claim is:

1. A method of deflashing metal parts comprising applying a particulate reusable blasting medium in a jet stream to said metal parts, said blasting medium comprising a thermoplastically processable polymer granulate filled with finely divided metal particles, wherein said metal particles are coated with an adhesion promoter, said metal particles being softer than said metal parts.

2. The method of claim 1 wherein said adhesion promoter is an amino silane or epoxy silane and is on said metal particles in a silane amount of 0.1% to 0.4% by weight.

3. The method of claim 2 wherein said silane amount is 0.2% to 0.25% by weight.

4. The method of claim 1 wherein said granulate is selected from the group consisting of polyamide, polycarbonate, and mixtures thereof.

5. The method of claim 1 wherein said polymer granulate contains a metal amount of 20% to 90% by weight of said metal particles, based on said particles plus said granulate.

6. The method of claim 5 wherein said metal amount is 60% to 80%.

7. The method of claim 1 wherein said metal particles are selected from the group consisting of iron, copper, tin, stainless steel, brass, bronze, and mixtures thereof.

8. The method of claim 7 wherein said metal particles are bronze.

9. The method of claim 1 wherein said metal particles are spherical or powder.

10. The method of claim 1 wherein said metal particles are of a particle size of 0.01 to 0.5 mm.

11. The method of claim 10 wherein said particle size is 0.05 to 0.1 mm.

12. The medium of claim 1 which is cubic and has edge lengths of 0.5 to 2.0 mm.

13. The method of claim 12 wherein said edge lengths are 0.75 and 1.5 mm.

14. The method of claim 1 wherein said granulate is polyamide 11, polyamide 12, or mixtures thereof, said metal particles are bronze and have a particle size of 0.05 and 0.1 mm.

15. The method of claim 1 wherein said medium is formed by a process comprising:
melting said polymer granulate to form a melted granulate,
applying said adhesion promoter to said metal particles, which are in spherical or powder form to form coated metal particles,
intimately mixing said melted granulate with said coated metal particles to form a mixture, and
extruding said mixture to form said medium,
whereby said medium is of cubic form.

16. The method of claim 15 wherein said granulate is selected from the group consisting of polyamides, polycarbonates, and mixtures thereof,
said metal particles are selected from the group consisting of iron, copper, tin, stainless steel, brass, bronze, and mixtures thereof.

17. The method of claim 16 wherein 0.1% to 0.4% by weight of said adhesion promotor is applied to said metal particles, said metal particles being 0.01 to 0.5 mm in diameter, and edges of said cubic form are 0.50 to 2.0 mm.

18. The method of claim 17 wherein 0.2% to 0.25% by weight of said adhesion promotor is applied to said metal particles.

19. The method of claim 18 wherein said adhesion promoter is an amino silane or an amino silane.

20. The method of claim 19 wherein said polymer granulate is selected from the group consisting of polyamide 11, polyamide 12, and mixtures thereof, and said metal particles are bronze and have a particle size of 0.05 to 0.1 mm.

21. A method of deflashing metal parts comprising applying a particulate reusable blasting medium, in a jet stream, to said metal parts, said medium comprising a thermoplastically processable polymer granulate filled with finely divided metal particles wherein said metal particles are coated with an adhesion promoter, said metal particles being softer than said metal parts,
said polymer granulate being selected from the group consisting of polyamide, polycarbonate, and mixtures thereof, said metal particles being selected from the group consisting of iron, copper, tin, stainless steel, brass, bronze, and mixtures thereof, said metal particles being 0.01 to 0.5 mm in diameter, said metal particles having 0.1% to 0.4% by weight of said adhesion promoter which is applied thereto, said adhesion promoter being an amino or an epoxy silane, said polymer granulate having been melted and said metal particles intimately mixed therewith, to form a mixture which has been extruded, said medium being in cubic form with an edge length of 0.50 to 2.0 mm.

22. The method of claim 21 wherein said polymer granulate is polyamide 11 or polyamide 12, and said metal particles are bronze and said particle size is 0.05 to 0.1 mm.

* * * * *